Oct. 22, 1968    HANS-JOACHIM DIETZSCH    3,406,435
APPARATUS FOR MANUFACTURING CERAMIC ELEMENTS HAVING
A HONEYCOMB STRUCTURE

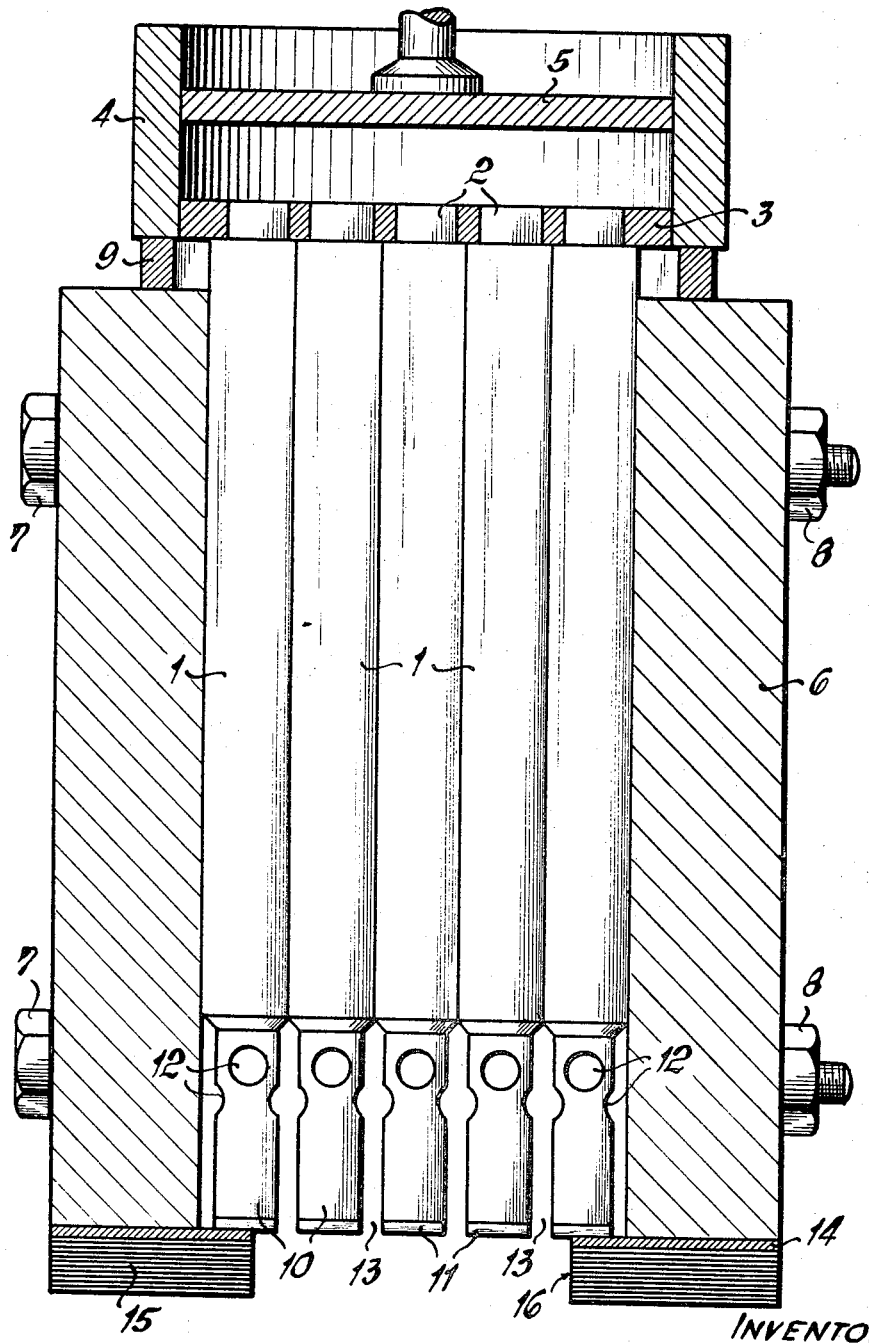

Filed Aug. 12, 1965          2 Sheets-Sheet 2

INVENTOR
Hans-Joachim Dietzsch
by Pierce & Pierce
attorneys

United States Patent Office 3,406,435
Patented Oct. 22, 1968

3,406,435
APPARATUS FOR MANUFACTURING CERAMIC ELEMENTS HAVING A HONEYCOMB STRUCTURE
Hans-Joachim Dietzsch, Chalet Sunny Val, Switzerland, assignor to Firma Schneider & Co., Frechen, Germany, a corporation of Germany
Filed Aug. 12, 1965, Ser. No. 479,260
Claims priority, application Germany, Aug. 21, 1964, D 45,250
7 Claims. (Cl. 25—17)

ABSTRACT OF THE DISCLOSURE

Apparatus for manufacturing ceramic elements having a honeycomb structure in which the die plate of the extruder has a plurality of holes through which plastic material is extruded. Parallel sleeves are associated with the holes and each sleeve has an extension provided with a closed outer end and lateral orifices so that the material flows in the form of parallel individual streams which becomes reshaped into a coherent element having a honeycomb structure. The holding means for the sleeves has an apertured member in the region of the lower ends of the sleeve extensions for enabling lubricant to be delivered for facilitating the feed of the honeycomb structure.

Summary

Ceramic elements having a honeycomb structure in which the elongate cavities are parallel, possess high compressive strength longitudinally and are useful in the building industry for lightweight structural parts, in chemical engineering for packing elements and catalyst supports, for example.

Such honeycomb elements have already been manufactured from plastics, namely with an apparatus which embraces a support plate with channels and a large number of shaping elements screwed centrally onto the support plate and having dimensions and conformation corresponding to the cross-section of the elongated cavities. It is possible with such an apparatus to extrude honeycomb elements consisting of plastics in the form of a strand, but such apparatuses cannot be used generally. For it is not possible to extrude relatively viscous compounds with them, since in this case the stability of such an apparatus is inadequate for the pressures required for such an extrusion, and the honeycomb element which emerges thus becomes deformed. More particularly, however, it is impossible to manufacture with such an apparatus a honeycomb element of which the elongated cavities possess an extremely small diameter which is desirable according to the invention. The fastening of the shaping parts on the support plate, and also the incorporation of the feed bores for the material in the support plate, necessitate relatively large hollow channels in the finished honeycomb element. Lastly, it is extremely difficult, if not actually quite impossible, to incorporate the said bores accurately in the support plate, together with the screwthreaded bores which are necessary for attaching the shaping parts, in the case of small dimensions of the elongated cavities or channels. Thus, even if the known apparatus is appropriately converted for operation with relatively viscous material, such for example as a plastic ceramic compound, only a honeycomb product with comparatively nonuniform wall thickness and with irregular cross-sections of the elongated cavities or channels is obtained.

It is the underlying aim of the invention to produce an apparatus whereby the above-described disadvantages are eliminated, and which permit also the production of honeycomb elements having extremely narrow hollow channels and extremely thin channel walls, but with uniform cross-section along the total length of the channels. The apparatus possesses adequate stability against deformation, even when used for manufacturing honeycomb elements consisting of extremely viscous materials, such as a plastic ceramic compound, and requires a small outlay of machinery and labour.

Lastly, the apparatus is constructed in such a way that individual shaping parts or sleeves can be exchanged rapidly and simply in the event of their becoming clogged or otherwise unserviceable in the course of time.

Brief description of drawing

FIGURE 1 is a vertical sectional elevation of an apparatus for manufacturing ceramic elements having a honeycomb structure, the several sleeves being shown in side elevation;

Figure 4:
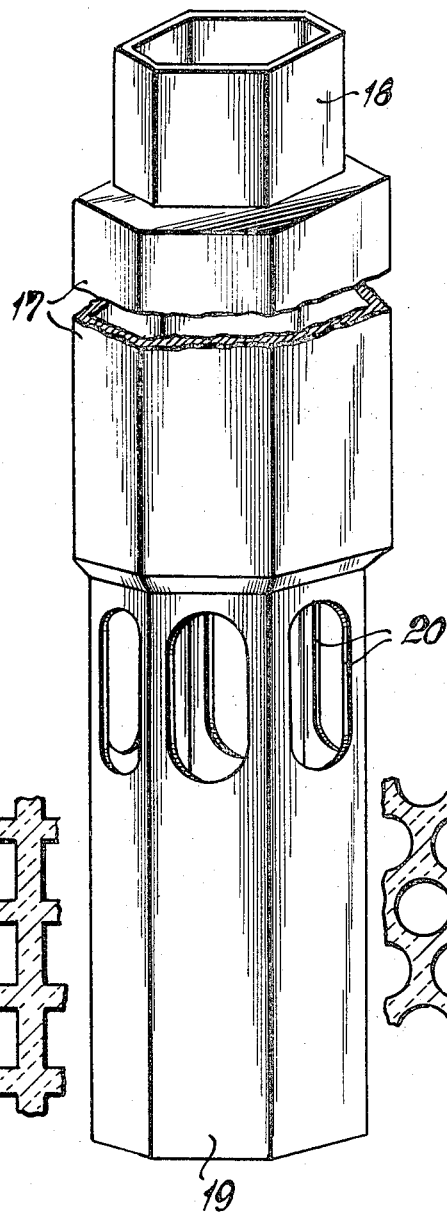
FIGURE 4 is an enlarged perspective view of an alternate form of sleeve which is hexagonal in cross section. the central portion being broken away.

According to FIG. 1, the sleeves 1 are fitted by their tapered upper ends 2 into the plate 3, which in the exemplary embodiment illustrated simultaneously acts as the die plate of the extruder cylinder 4 for the extruder ram 5. 6 designates a metal block which is held together by the screw bolts 7 and the nuts 8, and which surrounds the bundle of sleeves 1, so that the latter is secure against deformation or displacement of single sleeves or all the sleeves during the extrusion process. Distance pieces 9 are present between the extruder cylinder 4 and the metal blocks 6.

Figure 2:
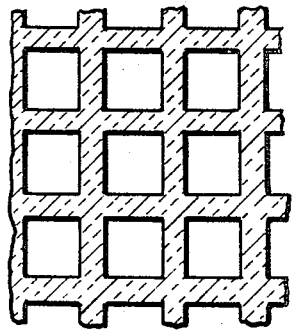
FIGURE 2 is an enlarged fragmentary sectional view of a honeycomb structure produced from an apparatus as shown in FIGURE 1 in which the hollow channels are square in cross section.
Figure 3:
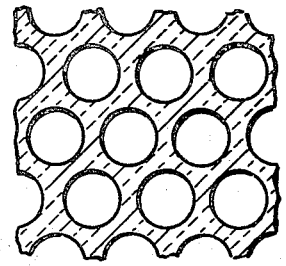
FIGURE 3 is an enlarged fragmentary sectional view similar to FIGURE 2 but in which the hollow channels are circular in cross section.

At the lower ends of the sleeves 1 are located sleeve extensions 10 which possess a smaller diameter than the sleeves 1. The said sleeve extensions possess a closure plate or a base 11 and lateral orifices 12, from which the ceramic initial material which is extruded through the sleeve by means of the ram 5 exits, and becomes recombined to constitute the walls of the hollow channels in the element having a honeycomb structure. The said walls of the element having a honeycomb structure are formed in the channels 13 which are in mutual communication and which deflect the partial strands which exit from the orifices 12 so that they again move in the feed direction of the ram 5 and thereby become combined to form the walls of the cavities in the element having a honeycomb structure. FIG. 1 also shows, at the lower end of the apparatus, an aperture element 15 connected to the metal block 6. If required, a lubricant may emerge at the inner boundary surface 16 of the said aperture element 15 from orifices or the like provided in the aperture elements, which facilitate the feed of the element having a honeycomb structure through the aperture elements. FIGS. 2 and 3 show cross-sections of an element having a honeycomb structure which has been manufactured according to the invention. Of these figures, FIG. 2 shows an element with hollow channels of square cross-section, whereas the section according to FIG. 3 indicates an element having a honeycomb structure of which the hollow channels possess a circular cross-section.

FIG. 4 shows, in an enlarged view, an individual sleeve of hexagonal cross-section. The sleeve comprises the upper part 17, which is shown interrupted in order to make the drawing appropriately shorter. This upper part 17 preferably has a length corresponding to ten times its diameter. The upper end of the upper section 17 of the sleeve merges into a tapered part 18 which corresponds to the tapered part 2 according to FIG. 1, which is fitted into the plate 3 illustrated in that figure.

A sleeve extension 19 is fitted to the lower end of the sleeve part 17. The said sleeve extension possesses orifices 20 on all six sides. The interval between the orifices 20 and the closed base of the sleeve extension 19 is greater than the diameter of the sleeve extension 19, as the drawing clearly shows.

From the above description, it will be understood that the material in the cylinder 4 is forced out by the ram 5 through the die plate 3 into the parallel sleeves 1, through which the material flows in the form of parallel individual strands. The sleeves 1 are held in the die plate 3 by tapered end portions 2, which fit tapered holes in the die plate, and are held together against deformation by a jacket in the form of plates or blocks 6 secured by bolts 7 and nuts 8. At the end of each sleeve is an extension 10 having lateral orifices 12 and a closed bottom 11, the orifices being spaced from the respective bottoms 11 a distance equal to or greater than the diameter of the extension 10. The sleeve extensions 10 are spaced from each other to provide channels 13 in which the material from the orifices 12 become reshaped into a coherent honeycomb structure.

It is recommended that the length of the sleeves 1 be at least ten times their inside diameter so as to provide a honeycomb structure as small as possible. This provides a sufficiently long sleeve 1, which enables a large number of them to be tightly combined to form a bundle, and serves to maintain uniform flow velocity even though slight inaccuracies should exist in the outlet orifices. Furthermore, the wall thickness of sleeves should be less than 0.5 mm. and preferably less than 0.2 mm.

A further feature of the invention resides in providing at the lower end of the apparatus a metal block 15, which has a central aperture 16 through which the honeycomb structure passes. This enables lubricant to be delivered to the structure passing therethrough for facilitating such movement, and as a consequence, distortion of the honeycomb structure by friction phenomena in this region is prevented.

The drawing is intended only to explain the idea of the invention, but does not limit the invention to the forms, dimensions or proportions shown therein.

Insofar as the principle of the invention is applicable to metals or to glass within the scope of expert knowledge, the invention is of course not restricted in this respect.

I claim:
1. Apparatus for manufacturing ceramic elements having a honeycomb structure, comprising a die plate of an extruder having a plurality of transverse holes through which plastic material is extruded, sleeves associated with said holes respectively, means for holding said sleeves in parallel relationship, and an extension on each sleeve having a closed outer end and lateral orifices, thereby to provide around the periphery of the extensions interstices through which the material flows in the form of parallel individual streams and becomes reshaped into a coherent element having a honeycomb structure.

2. Apparatus for manufacturing ceramic elements having a honeycomb structure as claimed in claim 1 in which said sleeves have a length at least ten times the diameter thereof.

3. Apparatus for manufacturing ceramic elements having a honeycomb structure as claimed in claim 1 in which the lateral orifices are spaced from the free edge of said sleeves a distance at least equal to or greater than the diameter of said sleeve extensions.

4. Apparatus for manufatcuring ceramic elements having a honeycomb structure as claimed in claim 1 comprising an apertured member on said sleeve holding means disposed in the region of the lower ends of said sleeve extensions for enabling lubricant to be delivered for facilitating the feed of the honeycomb structure.

5. Apparatus for manufacturing ceramic elements having a honeycomb structure as claimed in claim 1 in which the sleeve holding means comprises a jacket surrounding the sleeves.

6. Apparatus for manufacturing ceramic elements having a honeycomb structure as claimed in claim 1 in which the sleeves are arranged in close juxtaposition.

7. Apparatus for manufacturing ceramic elements having a honeycomb structure as claimed in claim 1 comprising tapered upper end portions on said sleeves, there being tapered holes in said die plate to receive such tapered end portions.

References Cited
UNITED STATES PATENTS

| | | | |
|---|---|---|---|
| 1,849,431 | 3/1932 | Mayhew | 25—17 |
| 1,858,620 | 5/1932 | Frandsen | 25—18 XR |
| 3,069,724 | 12/1962 | Schiedrum | 18—14 |
| 3,296,662 | 1/1967 | Raley | 18—14 |

FOREIGN PATENTS

| | | |
|---|---|---|
| 578,656 | 1924 | France. |
| 744,632 | 1933 | France. |
| 763,810 | 1935 | France. |
| 739,657 | 1955 | Great Britain. |

OTHER REFERENCES

German printed application 1,050,990 (1959).

WILLIAM J. STEPHENSON, *Primary Examiner.*